UNITED STATES PATENT OFFICE.

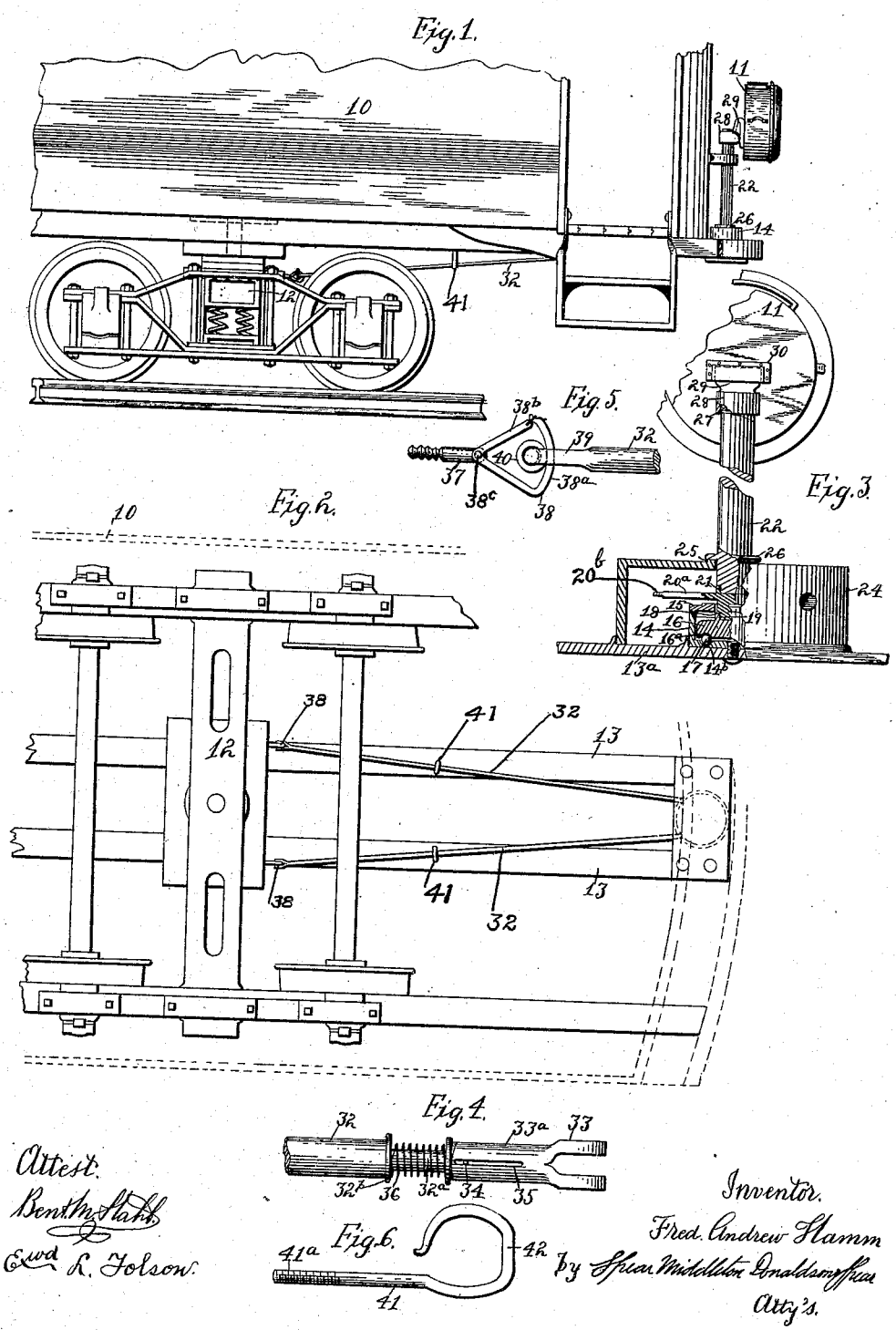

FREDERICK ANDREW HAMM, OF OLEAN, NEW YORK.

DEVICE FOR OPERATING HEADLIGHTS.

No. 911,394.  Specification of Letters Patent.  Patented Feb. 2, 1909.

Application filed May 29, 1908. Serial No. 435,757.

*To all whom it may concern:*

Be it known that I, FREDERICK A. HAMM, a citizen of the United States, residing at Olean, New York, have invented certain new and useful Improvements in Devices for Operating Headlights, of which the following is a specification.

My invention relates to improvements in automatically adjustable headlights for street cars and similar vehicles, and the object of the invention is to provide a simple, durable, economical and efficient construction, by which the headlight may be automatically deflected the desired amount upon rounding curves.

The invention includes the various novel features of construction and arrangement and combination of parts hereinafter described and particularly set forth in the appended claims.

I have illustrated the invention in connection with a sufficient portion of a street car to illustrate its mode of application in the accompanying drawings.

In these drawings,—Figure 1 is a side elevation of such portion of the car with the headlight and the operating connection applied thereto. Fig. 2 is a bottom plan view. Figs. 3, 4, 5 and 6 are detail views.

Referring by reference characters to these drawings, the numeral 10 designates a body of the car, 11 the headlight, and 12 the front swinging truck.

To the front ends of the beams 13 of the car body I secure a base plate 13$^a$, on which is mounted a cylindrical box 14, which is provided with a central opening for the passage of a screw or bolt by which said box is secured to the said plate. The bottom of the box is provided with an annular depression or groove for the reception of antifriction balls and is provided with a screw cover 15. Within the box is located a cylindrical bearing plate 16, which has an annular recess 16$^a$ in its underside corresponding to the annular recess 14$^b$, the two constituting a ball race for the reception of the antifriction balls 17, which permit the bearing plate 16 to rotate freely and without friction. This bearing plate 16 has an annular flange 18 projecting from its upper surface which is preferably provided with interior screw threads as shown to permit the detachable connection of the lower threaded portion 19 of a cross head 20, which is provided with a threaded socket 21 on its upper side. This socket is designed to permit the detachable connection of the lower end of the post 22 which has the said lower end threaded to engage the threaded socket 21. The said box and cross head are preferably housed within a casing 24, which may conveniently be made in the shape of an inverted metal box, and which is designed for the purpose of excluding dust and dirt from the working parts. This box is preferably provided with an upwardly extending annular flange 25 surrounding the opening through which the post passes and the post has an annular rib 26 overlapping this flange and forming a dust excluding joint. The post is threaded at its upper end as shown at 27 to engage the threaded socket 28 which carries suitable means for engaging or holding the headlight. This holding means may be of any suitable shape and adapted to engage the headlights ordinarily in use. As no novelty is claimed for the particular manner of connecting the headlight to the socket piece, I have shown for purposes of illustration a single upwardly projecting wedge shaped bracket or tongue 29 engaging a socket 30 on the back of the headlight 11.

The ends of the arms 20$^a$ of the cross head are provided with holes or perforations 20$^b$ designed to permit the detachable connection of the forked ends of the operating rods. The operating rods are shown at 32, and I prefer to make the said forked ends 33 separate from the main portions of the rods and connect them by a yielding sliding joint. The desired form of joint is shown in the drawings, each forked head or end 33 having a tubular socket portion 33$^a$, which receives the reduced end 32$^a$, of the rod 32, which is held in the socket by a transverse pin 34 engaging slots 35. A spring 36 encircles the reduced portion 32$^a$ outside of the socket between the end of the socket and the shoulder 32$^b$ and tends to keep the parts extended to the limit allowed by the pin and slot connection. The rods extend through the rear wall of the casing and are carried back and connected to the truck frame member or bolster. A desirable form of connection is to provide screw bolts 37 which are screwed into the front side of the frame member. Each bolt has pivoted thereto an eye piece or closed hook 38, which is designed to receive an eye 39 on the rear end of the rod 32, the portion of this eye which engages the hook being preferably provided with an antifriction roller 40. The front bar 38ª of the hook or eye 38 is preferably curved and this curve, together with the pivoted connection 38ᶜ of the hook 38 to the bolt 37 permits vertical play between the truck and rod. This is extremely desirable owing to the vertical movement of the truck due to the passage of the wheels over uneven places in the track or obstacle thereon, reducing liability of breaking the connecting rods to a minimum. The upper end of the curved portion 38ª is formed separate from the side 38ᵇ and the hook or loop is preferably formed of spring material so that the two meeting portions may be separated sufficiently to permit the eye 39 of the rod to be sprung into place. Each rod is preferably guided in a hanger 41, in the shape of a hook having a screw portion 41ª designed to be screwed into the underside of the car body and having on the lower side thereof a flat space 42 sufficiently wide to permit the lateral movement of the rod due to the swinging of the truck in relation to the car body in rounding curves.

From the foregoing description it is thought the operation of my improved device will be obvious, and it suffices to say that when the car is running upon a straight track the headlight will be pointed straight ahead, while in rounding curves the push upon the rod on one side and the pull of the rod upon the other side through the cross head will turn the headlight to keep the light focused upon the curved stretch of track immediately preceding the car.

During the day time when the light is not needed and in fact may not be carried upon the front of the car, the rods if desired may be disconnected from the hooks 38 and simply supported by the hangers 41. The springs at the forward end of the rods will prevent undue shocks or jolts being imparted to the headlight.

Having thus described my invention what I claim is:—

1. In combination with a car body, a support for a headlight rotatably carried at the front thereof and having cross arms, rods having their front ends yieldingly connected to the cross arms and extending directly to the truck frame and securing clips on the truck frame having arc shaped portions slidably engaging the rear ends of the rods, substantially as described.

2. In combination with a car body, a headlight support rotatably mounted at the front thereof, cross arms connected therewith, rods having telescoping front ends connected with said cross arms, springs associated with said telescoping ends, guides for the rods depending from the car body having elongated horizontal bearing portions and flexible connections between the rear ends of the rods and the truck frame, substantially as described.

3. In combination with a car body or the like, a cylindrical box carried at the front thereof, having a removable cover, a cylindrical bearing plate rotatably mounted within the box, a cross head having a part extending through the cover of the box and detachably connected to the said cylindrical bearing plate, operating rods extending between the cross head and the truck frame, a post having a detachable connection with the cross head and a headlight supporting member detachably connected to the top of the post, substantially as described.

In testimony whereof, I affix my signature in presence of two witnesses.

FRED. ANDREW HAMM.

Witnesses:
CHAS. H. RAFFERTY,
PATRICK S. COLLINS.